(12) United States Patent
Lee et al.

(10) Patent No.: US 9,197,908 B2
(45) Date of Patent: Nov. 24, 2015

(54) METHOD FOR FILE FORMATION ACCORDING TO FREEVIEW AV SERVICE

(75) Inventors: Tae Jin Lee, Daejeon (KR); Jae-Hyoun Yoo, Daejeon (KR); Kyeongok Kang, Daejeon (KR); Jin Woo Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 915 days.

(21) Appl. No.: 13/003,188

(22) PCT Filed: Oct. 7, 2008

(86) PCT No.: PCT/KR2008/005881
§ 371 (c)(1),
(2), (4) Date: Jan. 7, 2011

(87) PCT Pub. No.: WO2010/005149
PCT Pub. Date: Jan. 14, 2010

(65) Prior Publication Data
US 2011/0160886 A1 Jun. 30, 2011

(30) Foreign Application Priority Data
Jul. 9, 2008 (KR) .......................... 10-2008-0066484

(51) Int. Cl.
*H04N 21/2343* (2011.01)
*H04N 21/472* (2011.01)
(Continued)

(52) U.S. Cl.
CPC ... *H04N 21/234318* (2013.01); *H04N 21/4755* (2013.01); *H04N 21/47205* (2013.01); *H04N 21/8133* (2013.01)

(58) Field of Classification Search
CPC ............... H04N 21/234318; H04N 21/47205; H04N 21/4755; H04N 21/8133
USPC ............ 715/704, 716, 719, 727, 730; 700/94; 381/101, 104
See application file for complete search history.

(56) References Cited

U.S. PATENT DOCUMENTS

| 6,904,227 B1 * | 6/2005 | Yamamoto et al. ............ 386/241 |
| 2002/0061136 A1 * | 5/2002 | Shibata et al. ................ 382/199 |

(Continued)

FOREIGN PATENT DOCUMENTS

| KR | 10-2006-0048551 | 5/2006 |
| KR | 1020070047192 | 5/2007 |

(Continued)

OTHER PUBLICATIONS

International Search Report for Application No. PCT/KR2008/005881, dated Mar. 23, 2009.

(Continued)

*Primary Examiner* — Fan Tsang
*Assistant Examiner* — Eugene Zhao
(74) *Attorney, Agent, or Firm* — Nelson Mullins Riley & Scarborough LLP; Anthony A. Laurentano, Esq.; Lewis Lee, Esq.

(57) ABSTRACT

A method of creating a file according to a freeview audio/video (AV) service, the method including: creating a file header that includes content related information, AV object related information, preset related information, or preset information associated with at least one preset; creating audio object information associated with at least one audio object; creating video object information associated with at least one video object; and processing the file header, the audio object information, and the video object information into a preset format of a single freeview AV file to store the processed preset format of the freeview AV file is provided.

11 Claims, 5 Drawing Sheets

(51) Int. Cl.
*H04N 21/475* (2011.01)
*H04N 21/81* (2011.01)

(56) References Cited

U.S. PATENT DOCUMENTS

| | | | |
|---|---|---|---|
| 2004/0181747 A1* | 9/2004 | Hull et al. | 715/500.1 |
| 2005/0021754 A1* | 1/2005 | Alda et al. | 709/225 |
| 2005/0117019 A1 | 6/2005 | Lamboray et al. | |
| 2005/0198677 A1* | 9/2005 | Lewis | 725/87 |
| 2005/0238057 A1* | 10/2005 | Toma et al. | 370/503 |
| 2006/0012831 A1* | 1/2006 | Narimatsu et al. | 358/3.28 |
| 2008/0147558 A1* | 6/2008 | Kraus | 705/59 |
| 2010/0077212 A1* | 3/2010 | McReynolds et al. | 713/168 |

FOREIGN PATENT DOCUMENTS

| | | |
|---|---|---|
| KR | 10-2007-0060951 | 6/2007 |
| KR | 10-2008-0051041 | 6/2008 |
| WO | 2004/102961 A1 | 11/2004 |
| WO | 2006/090159 A1 | 8/2006 |

OTHER PUBLICATIONS

Written Opion for Application No. PCT/KR2008/005881, dated Mar. 23, 2009.

* cited by examiner

Fig. 2

| CONTENT RELATED INFORMATION | AV OBJECT RELATED INFORMATION | PRESET RELATED INFORMATION |
|---|---|---|
| · CONTENT NAME<br>· CREATOR<br>· CREATED DATE<br>· GENRE | · NUMBER OF VIDEO OBJECTS<br>· NUMBER OF AUDIO OBJECTS<br>· PLAY TIME | · NUMBER OF CONSTANT PRESETS<br>· NUMBER OF VARIABLE PRESETS |

Fig. 3

CONSTANT PRESET

· CONSTANT PRESET NAME
· VIDEO OBJECT ID
· VIDEO OBJECT PROPERTY
· AUDIO OBJECT IDs 1~N
· AUDIO OBJECT PROPERTY

Fig. 4

VARIABLE PRESET

· VARIABLE PRESET NAME
· NUMBER OF TIME INDEXES
· TIME INDEXES 1 ~T
　· VIDEO OBJECT CONVERSION PROPERTY
　· VIDEO OBJECT ID
　· VIDEO OBJECT PROPERTY
　· AUDIO OBJECT IDs 1~N
　· AUDIO OBJECT PROPERTY

METHOD FOR FILE FORMATION ACCORDING TO FREEVIEW AV SERVICE

RELATED APPLICATIONS

This application is a 35 U.S.C. §371 national stage filing of PCT Application No. PCT/KR2008/005881 filed on Oct. 7, 2008, which claims priority to, and the benefit of, Korean Patent Application No. 10-2008-0066484 filed on Jul. 9, 2008. The contents of the aforementioned applications are hereby incorporated by reference.

TECHNICAL FIELD

The present invention relates to a method of creating a file according to a freeview audio/video (AV) service, and more particularly, to a file format for providing a freeview AV service, a method of creating the file format, and a method of playing the file format.

BACKGROUND ART

With development of digital technologies, an audio/video (AV) service has been changing from a passive/uni-directional AV service to a user-participant AV service. A freeview AV service denotes a user-oriented realistic audio and video service that enables a user to readily select and view the user's desired viewpoint and listening point as if the user is navigating a scene.

In the case of a general multimedia service, a service usually includes a single audio object and a single video object. A Motion Picture Experts Groups (MPEG)-4 system standard defines a multimedia service that includes a plurality of objects. Also, the freeview AV service may be multimedia content that includes a plurality of objects, which is similar to the defined MPEG-4 system standard.

Also, the MPEG-4 system standard such as International Standardization Organization (IOS)/International Electrotechnical Commission (IEC) 14496-1 defines a file format of a content that includes a plurality of objects. The file format according to the MPEG-4 system standard includes Binary Format for Scenes (BIFS) corresponding to three-dimensional (3D) scene information of objects, OD corresponding to object information, index information that is accessible to a stream of each object, and object stream data such as BIFS, OD, and the like. In this instance, each object data may exist in the file or may exist in another file.

The index information associated with each object stream may be classified and stored for each object. Each object stream may also be classified and stored for each stream. The above scheme is flexibly defined to receive all the types of objects, such as audio, video, still images, and the like.

The MPEG-4 system may change 3D scene information through a user interaction using BIFS data and a BIFS command. In this instance, the BIFS data needs to be appropriately created in the stage of copyrights. A terminal may need to interpret the BIFS command. The MPEG-4 system includes a function for various types of user interactions, which may require relatively complex operations in the stage of copyrights or the play terminal.

However, the MPEG-4 system standard defines the file format that includes all the diversified media such as audio, video, still images, and the like, whereas freeview AV contents include the same kind of multiple objects. Accordingly, there is a need for a file format that can more effectively store contents in comparison to the file format defined in the existing MPEG-4 system standard and can enhance readiness of access to each object.

DISCLOSURE OF INVENTION

Technical Problem

An aspect of the present invention provides a file format that can construct various types of audio/video (AV) scenes in a single freeview AV content using a constant preset and a variable preset.

Another aspect of the present invention also provides a method that enables a user to select a single preset in a freeview AV content created by a single editor and readily use the freeview AV content.

Technical Solution

According to an aspect of the present invention, there is provided a method of creating a file according to a freeview audio/video (AV) service, the method including: creating a file header that includes content related information, AV object related information, preset related information, or preset information associated with at least one preset; creating audio object information associated with at least one audio object; creating video object information associated with at least one video object; and processing the file header, the audio object information, and the video object information into a preset format of a single freeview AV file to store the processed preset format of the freeview AV file.

In this instance, the processing and the storing may process the file header, the audio object information, and the video object information into the preset format of the single freeview AV file to store the processed format of the freeview AV file according to setting time information.

According to another aspect of the present invention, there is provided a method of playing a file according to a freeview AV service, the method including: receiving freeview AV file information that is processed into a preset format; extracting a file header from the freeview AV file information; extracting audio object information associated with at least one audio object from the freeview AV file information; extracting video object information associated with at least one video object from the freeview AV file information; and analyzing at least one of the extracted file header, the audio object information, and the video object information to play the freeview AV file information.

According to still another aspect of the present invention, there is provided a file format according to a computer-readable freeview AV service, including: a file header unit creating a file header that includes content related information, AV object related information, preset related information, or preset information associated with at least one preset; an audio object information storage unit creating and storing audio object information associated with at least one audio object; and a video object information storage unit creating and storing video object information associated with at least one video object.

According to yet another aspect of the present invention, there is provided an apparatus for playing a file according to a freeview AV service, the apparatus including: a receiver receiving freeview AV file information that is processed into a preset format; a file header extractor extracting a file header from the freeview AV file information; an audio extractor extracting audio object information associated with at least one audio object from the freeview AV file information; a video extractor extracting video object information associated with at least one video object from the freeview AV file information; and a play unit analyzing at least one of the extracted file header, the audio object information, and the video object information to play the freeview AV file information.

Advantageous Effects

According to the present invention, there is provided a file format that can construct various types of AV scenes in a single freeview audio/video (AV) content using a constant preset and a variable preset.

Also, according to the present invention, there is provided a method that enables a user to select a single preset in a freeview AV content created by a single editor and readily use the freeview AV content.

BRIEF DESCRIPTION OF THE DRAWINGS

FIG. 2 illustrates an example of a file header according to an embodiment of the present invention;

FIG. 3 illustrates an example of information associated with a constant preset according to an embodiment of the present invention;

FIG. 4 illustrates an example of information associated with a variable preset according to an embodiment of the present invention;

MODE FOR THE INVENTION

Figure 1:
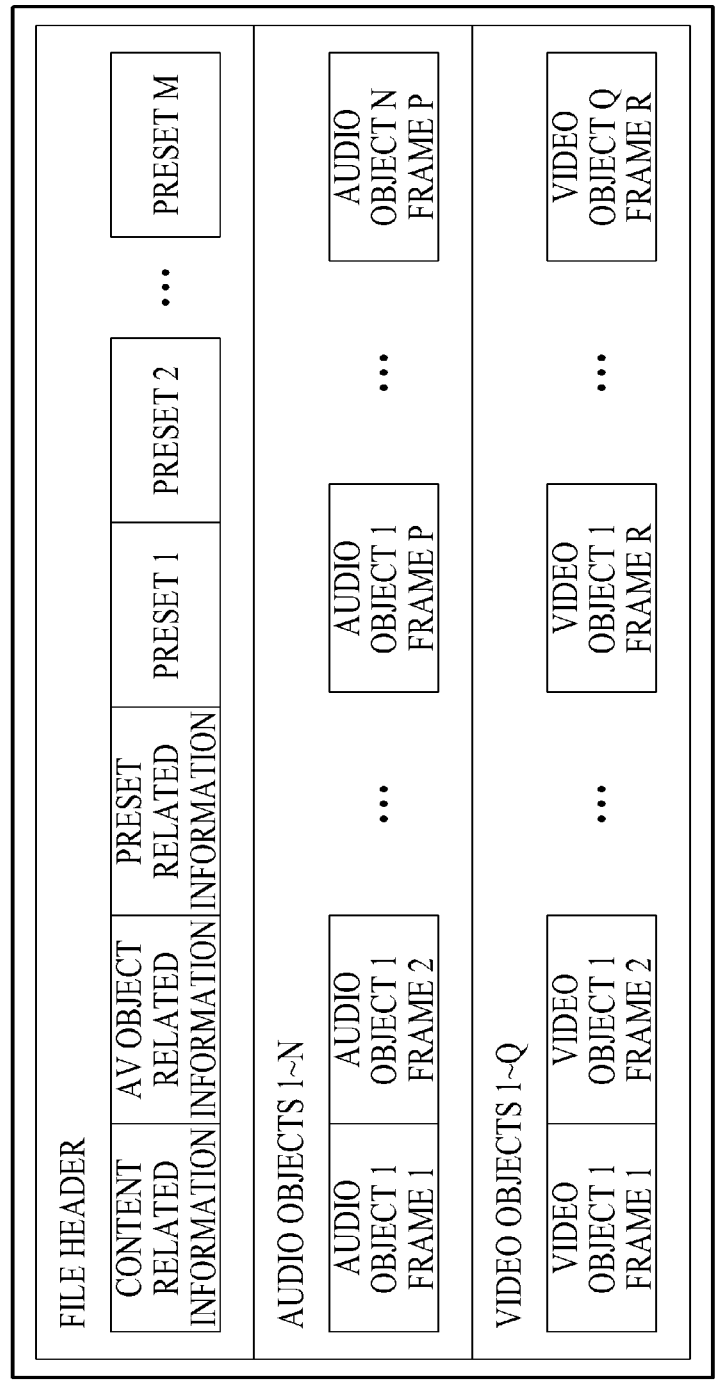
FIG. 1 illustrates an example of a configuration of a file format according to a freeview AV service of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

When it is determined detailed description related to a related known function or configuration they may make the purpose of the present invention unnecessarily ambiguous in describing the present invention, the detailed description will be omitted here. Also, terms used herein are defined to appropriately describe the exemplary embodiments of the present invention and thus may be changed depending on a user, the intent of an operator, or a custom. Accordingly, the terms must be defined based on the following overall description of this specification.

FIG. 1 illustrates an example of a configuration of a file format according to a freeview AV service of the present invention.

According to an aspect of the present invention, when using the freeview AV service, an editor may construct various types of AV scenes by controlling viewpoints of video objects and a location or size of audio objects. In this instance, an element that can construct the above AV scene may be referred to as a "preset".

For example, when creating a singer's music video as freeview AV content, video objects from various viewpoints such as the front, the side, the rear, and the like, and various types of audio objects such as the singer's voice, musical instruments, and the like exist in a single content. Therefore, the editor can select a particular video object at a particular point in time using various types of AV objects and select a location or volume of an audio object, thereby creating the preset.

Specifically, according to an aspect of the present invention, when a plurality of singers exists, a preset based on each singer may be created. A user may select and view a preset that is created based on the user's desired singer.

The file format according to the freeview AV service of the present invention may be characterized by a preset that is set in advance by an editor and a user control.

Specifically, the editor may combine AV objects to thereby construct various types of AV scenes and provide a user with the constructed AV scenes in the form of a preset, and the user may readily make a selection from a single AV content according to the user's preference. Also, the user may also directly control AV objects to thereby construct the user's own AV scene.

Accordingly, the file format for providing the freeview AV service of the present invention may be described as follows:

As shown in FIG. 1, the file structure according to the AV freeview AV service of the present invention includes a file header unit, an audio object information storage unit, and a video object information storage unit.

The file header unit denotes a file header of a file according to the freeview AV service, and includes various types of information such as content related information, AV object related information, preset related information, and preset information associated with at least one preset.

The audio object information storage unit may create and store audio object information associated with at least one audio object. Specifically, the audio object information storage unit may store information associated with various types of audio objects that are included in the file according to the freeview AV service.

Also, the video object information storage unit may create and store video object information associated with at least one video object. Specifically, the video object information storage unit may store information associated with various types of video objects that are included in the file according to the freeview AV service.

FIG. 2 illustrates an example of a file header according to an embodiment of the present invention.

As shown in FIG. 2, the file header stored in the file header unit includes various types of information such as content related information, AV object related information, and preset related information, and information associated with at least one preset.

In this instance, the content related information may include information associated with a content name, a creator, a genre, a created date, and the like.

The AV object related information may include information associated with a number of video objects, a number of audio objects, play time of the audio object information, and the like.

Also, the preset related information may include information regarding at least one of a number of constant presets and a number of variable presets. Specifically, according to an aspect of the present invention, since information associated with a plurality of presets is provided, information associated with the number of presets may be included in the preset related information so as to make it convenient for an editor or a user to edit or select the preset information.

FIG. 3 illustrates an example of information associated with a constant preset according to an embodiment of the present invention.

Also, the preset information may include information associated with at least one edited constant preset. As shown in FIG. 3, information associated with the at least one edited preset may include information associated with a constant preset name, a video object identification (ID), a video object property, at least one audio object ID, and audio object property.

In this instance, the video object ID information may include information associated with an ID that is selected from the at least one video object ID included in a freeview AV content. The video object property information may include zoom in/out information. The audio object property information may include location information or size information associated with a selected audio object ID.

FIG. 4 illustrates an example of information associated with a variable preset according to an embodiment of the present invention.

Also, the preset information may include information associated with at least one edited variable preset. As shown in FIG. 4, information associated with the at least one edited variable preset may include information associated with a variable preset name, a number of time indexes, video object conversion property for each time index, a video object ID for each time index, video object property for each time index, audio object ID for each time index, and audio object property for each time index.

In this instance, the time index denotes time information for setting information associated with a particular video object and a particular audio object at a particular point in time. The time index enables the editor to select various types of video object information according to time.

Also, the video object conversion property information for each time index may include effect information that is obtained by combining at least two video objects. Therefore, when converting video object information for each time index, a conversion scheme between previous video object information and converted video object information may be defined. Also, the video object conversion property information may express the effect that is obtained by overlapping the previous video object information and the converted video object information, or the effect that is obtained from the new video object information with pushing away the previous object information.

Also, according to an aspect of the present invention, the editor or the user may set the file format according to time.

Specifically, according to an aspect of the present invention, when processing the file header, the audio object information, and the video object information into a preset format of a single freeview AV file to store the processed preset format of the freeview AV file, it is possible to process the file header, the audio object information, and the video object information into the preset format of the single AV file to store the processed format of the freeview AV file according to setting time information of a user or an editor.

As described above, according to an aspect of the present invention, the editor may construct various AV scenes in a single freeview AV content using the file format according to the freeview AV service. The user may select a single preset to thereby effectively use the freeview AV service.

Specifically, the user may receive the AV content using a decoding apparatus and the like and then selectively use a freeview AV content. The AV content is provided by the file format according to the freeview AV service.

An apparatus for playing the file according to the freeview AV service may represent the decoding apparatus and hereinafter will be described with reference to FIG. 5.

Figure 5:
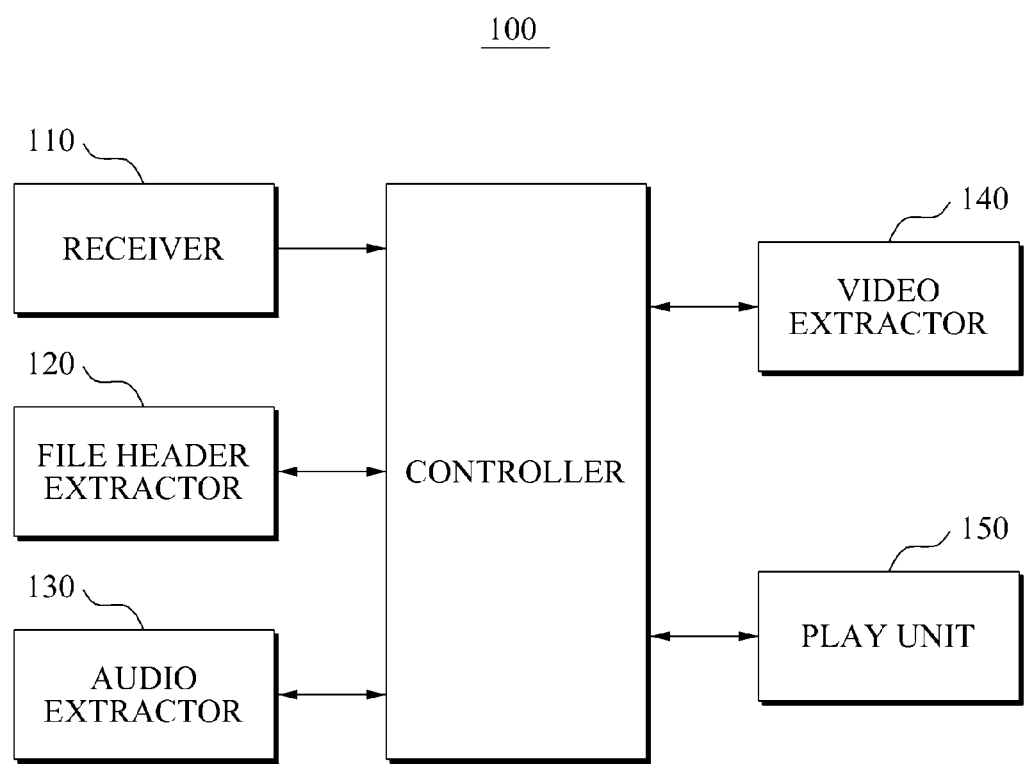
FIG. 5 is a block diagram illustrating a configuration of an apparatus for playing a file according to a freeview AV service of the present invention.

FIG. 5 is a block diagram illustrating an example of a configuration of an apparatus 100 for playing a file according to a freeview AV service of the present invention. The apparatus 100 may include a receiver 110, a file header extractor 120, an audio extractor 130, a video extractor 140, and a play unit 150.

The receiver 110 may receive freeview AV file information that is processed into a preset format.

The file header extractor 120 may extract a file header from the freeview AV file information.

The audio extractor 130 may extract audio object information associated with at least one audio object from the freeview AV file information.

The video extractor 140 may extract video object information associated with at least one video object from the freeview AV file information.

The play unit 150 may analyze at least one of the extracted file header, the audio object information, and the video object information to play the freeview AV file information.

As described above, the freeview AV file information is information that is selected and edited by the editor into the file format according to the freeview AV service, and includes all the edited information. The user may partially select and use the edited information.

Specifically, the file header may include various types of information such as content related information, AV object related information, and preset related information, preset information associated with at least one preset.

A method of creating a file according to a freeview AV service of the present invention may create the file that is produced based on a file format according to the freeview AV service. Therefore, the method may include all the configuration of the file format and thus further detailed descriptions related thereto will be omitted here.

Figure 6:
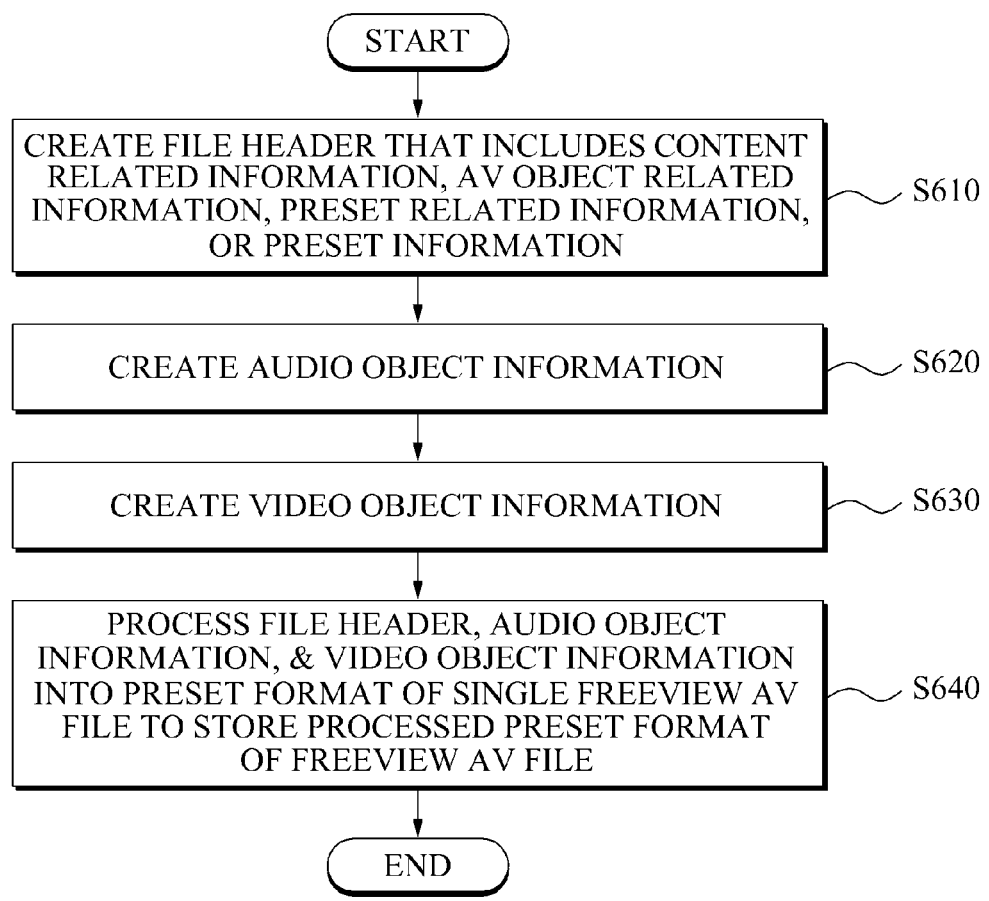
FIG. 6 is a flowchart illustrating an example of a method of creating a file according to a freeview AV service of the present invention.

FIG. 6 is a flowchart illustrating an example of a method of creating a file according to a freeview AV service of the present invention.

In operation S610, the method may create a file header that includes content related information, AV object related information, preset related information, or preset information associated with at least one preset.

In operation S620, the method may create audio object information associated with at least one audio object.

In operation S630, the method may create video object information associated with at least one video object.

In operation S640, the method may process the file header, the audio object information, and the video object information into a preset format of a single freeview AV file to store the processed preset format of the freeview AV file.

Hereinafter, a method of playing a file according to a freeview AV service of the present invention will be described with reference to FIG. 7.

The method of playing the file according to the freeview AV service may play the file that is produced based on the file format according to the freeview AV service. Therefore, the method may include all the configuration of the file format and thus further detailed descriptions related thereto will be omitted here.

Figure 7:
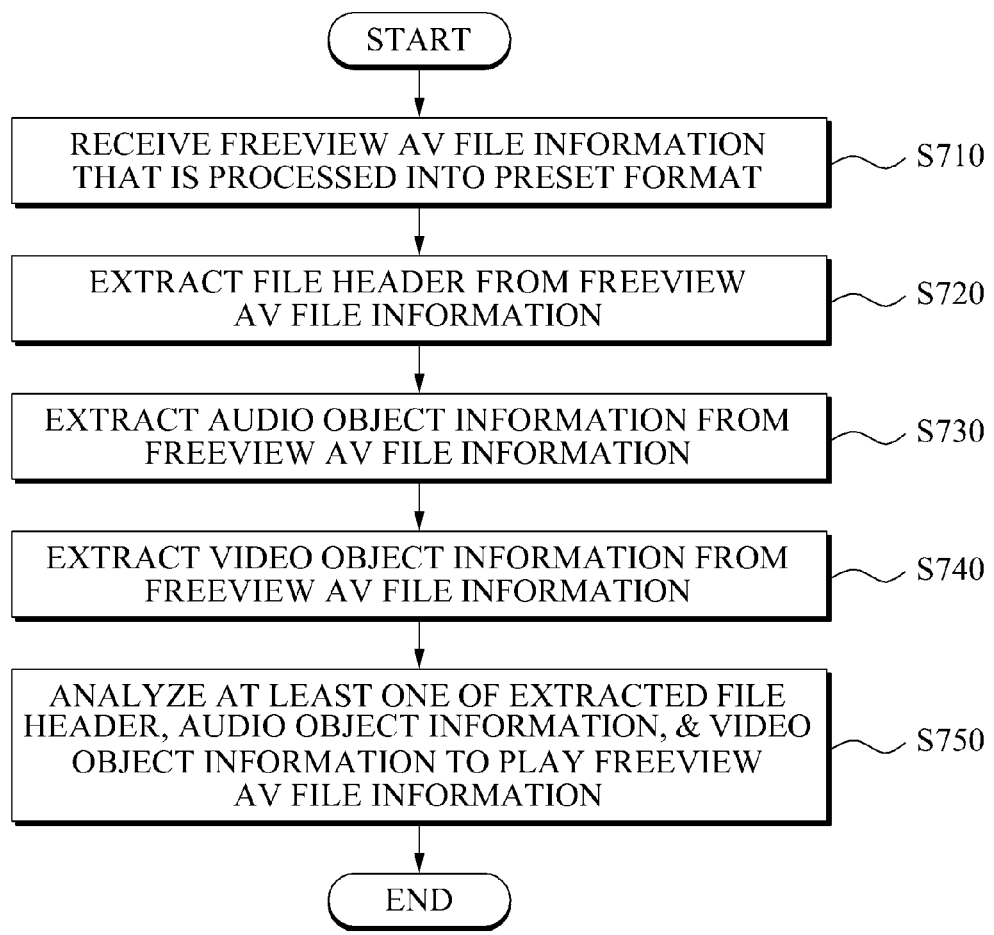
FIG. 7 is a flowchart illustrating an example of a method of playing a file according to a freeview AV service of the present invention.

FIG. 7 is a flowchart illustrating an example of a method of playing a file according to a freeview AV service of the present invention.

In operation S710, the method may receive freeview AV file information that is processed into a preset format.

In operation S720, the method may extract a file header from the freeview AV file information.

In operation S730, the method may extract audio object information associated with at least one audio object from the freeview AV file information.

In operation S740, the method may extract video object information associated with at least one video object from the freeview AV file information.

In operation S750, the method may analyze at least one of the extracted file header, the audio object information, and the video object information to play the freeview AV file information.

The exemplary embodiments of the present invention include computer-readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method performed by an apparatus for a user to select a desired freeview audio/video (AV) scene from a file created by a computer-based freeview AV service, the method comprising:
    creating, by a file header unit, a file header that includes content related information, AV object related information, preset related information, and preset information with at least one constant preset and at least one variable preset;
    creating, by an audio object information storage unit, at least one audio object information associated with at least one audio object;
    creating, by a video object information storage unit, at least one video object information associated with at least one video object; and
    processing the file header, the audio object information, and the video object information into a preset format of a single freeview AV file to store the processed preset format of the freeview AV file,
    wherein the preset information comprises viewpoints of video objects and a location or size of audio objects and the preset information is used to construct the freeview AV scene,
    wherein the user is able to select a viewpoint on the apparatus by controlling the viewpoint of the video object and the location or the size of the audio object through changing the at least one variable preset.

2. The method of claim 1, wherein:
    the preset information comprises information associated with at least one edited constant preset, and
    information associated with the at least one edited constant preset comprises information regarding at least one of a constant preset name, a video object identification (ID), a video object property, at least one audio object ID, and an audio object property.

3. The method of claim 2, wherein:
    the video object ID information comprises information associated with an ID that is selected from the at least one video object ID included in a freeview AV content,
    the video object property information comprises zoom in/out information, and
    the audio object property information comprises location information or size information associated with a selected audio object ID.

4. The method of claim 1, wherein:
    the preset information comprises information associated with at least one edited variable preset, and
    information associated with the at least one edited variable preset comprises information regarding at least one of a variable preset name, a number of time indexes, video object conversion property for each time index, a video object ID for each time index, video object property for each time index, audio object ID for each time index, and audio object property for each time index.

5. The method of claim 4, wherein the video object conversion property information for each time index comprises effect information that is obtained by combining at least two video objects.

6. The method of claim 1, wherein the content related information comprises information regarding at least one of a content name, a creator, a genre, and a created date.

7. The method of claim 1, wherein the AV object related information comprises information regarding at least one of a number of video objects, a number of audio objects, and play time of the audio object information.

8. The method of claim 1, wherein the processing and the storing processes the file header, the audio object information, and the video object information into the preset format of the single freeview AV file to store the processed format of the freeview AV file according to setting time information.

9. An apparatus for a user to select a desired freeview audio/video (AV) scene from a file created by a computer-based freeview AV service, comprising:
    a file header unit creating a file header that includes content related information, AV object related information, preset related information, and preset information with at least one constant preset and at least one variable preset;
    an audio object information storage unit creating and storing audio object information associated with at least one audio object; and
    a video object information storage unit creating and storing video object information associated with at least one video object,
    wherein the file header, the audio object information, and the video object information is processed into a preset format of a single freeview AV file and thereby is stored,
    wherein the preset information comprises viewpoints of video objects and a location or size of audio objects and the preset information is used to construct the freeview AV scene, wherein the user is able to select a viewpoint by controlling the viewpoint of the video object and the location or the size of the audio object through changing the at least one variable preset.

10. The apparatus for creating a file according to a computer-based freeview AV service of claim 9, wherein the single freeview AV file processes the file header, the audio object information, and the video object information into the preset format of the single AV file to store the processed format of the freeview AV file according to setting time information.

11. A computer-readable non-transitory recording medium storing a program for implementing the method according to claim 1.

\* \* \* \* \*